Aug. 15, 1933.  A. E. HONEY  1,922,294
ELECTRIC REGULATOR
Filed Sept. 3, 1931  5 Sheets-Sheet 1

Inventor
Alfred E. Honey
By Sommers & Young, attys.

Fig. 4.

Patented Aug. 15, 1933

1,922,294

UNITED STATES PATENT OFFICE 1,922,294

ELECTRIC REGULATOR

Alfred Edward Honey, Ilford, England, assignor to J. Stone & Company Limited, Deptford, England, a Company of Great Britain Application September 3, 1931, Serial No. 561,060, and in Great Britain October 2, 1930

19 Claims. (Cl. 171—313)

This invention relates to improvements in and connected with electric regulators. The specification of my Patent No. 1,892,617, patented December 27, 1932, describes automatic regulating means for electrical installations, comprising an electric motor which has a field magnet, preferably a permanent magnet, giving substantially constant excitation and which is responsive to the variation of an electrical quantity in said installation, and a centrifugal governor device driven by the motor and adapted for producing the mechanical effort required for the regulation. In addition to a permanent magnet, the regulator motor may also have an auxiliary excitable field magnet influenced by the variation of one or more electrical quantities in the installation.

The present invention is concerned with developments or adaptations of such regulating means intended more especially for dynamo-regulation and battery-charging control purposes in train lighting, heating and like installations, particularly single battery installations. With these objects in view, the regulator according to the invention comprises an electric motor variable in speed with variation of an electrical quantity in said installation, a centrifugal governor driven by said motor, and principal and auxiliary contact means actuated by said governor and operative respectively for regulating the voltage or current of the installation and for exercising a progressive adjustment or compensation upon the motor. The motor may have a permanent field magnet furnishing a constant excitation and an auxiliary excitable field magnet. In this case the auxiliary contact means may serve to vary progressively the value of a resistance in circuit with a winding on the excitable field magnet and thereby to modify the excitation of the motor.

It may be necessary for the excitable field magnet on the motor to experience, for dynamo regulation or battery-charging control purposes, a demagnetizing action with reference to the field of the permanent magnet. As, however, better regulation is obtained if the flux of the permanent magnet is never partly neutralized and, moreover, it is undesirable from a magnetization standpoint to subject the permanent magnet to a frequently recurrent or prolonged demagnetizing action, the auxiliary magnet may be provided with a constantly applied excitation which exerts a magnetizing action with reference to the permanent magnet. Said excitation, which may be termed a polarizing excitation, is made such that its magnetizing action is never completely neutralized by any demagnetizing tendencies of excitation which is influenced by the variation of the electrical quantities in the installation.

In addition to the winding producing this polarizing excitation, the auxiliary magnet may be provided, in a dynamo regulator, with a series demagnetizing winding carrying the whole or a part of the load or output current from the dynamo. The speed variations produced in the regulator motor by variation in the output current may then be employed to modify regulating resistance in the excitation circuit of the dynamo.

In order that the regulated dynamo may be given a characteristic better suited to the particular conditions in view than the characteristic obtainable simply with the polarizing and series windings, a third winding is provided which is arranged in series with a field circuit of the dynamo. Across the whole or a part of this winding is connected a variable diverter resistance, which resistance is varied by the auxiliary contact means of the regulator itself at the same time as the resistance in series with the dynamo field is varied.

For some purposes, the excitable auxiliary magnet may be provided with yet further windings enabling the dynamo regulator to perform, within certain limits, the functions also of a lamp-voltage regulator. Furthermore, the regulator may be provided with a subsidiary contact or contacts for performing the functions of the usual cut-in switch.

In a battery charging regulator in accordance with the invention, the excitation of the auxiliary field magnet may be varied progressively at the same time as the battery charging conditions are progressively varied. For example where the battery charging current from a dynamo is reduced progressively as the charge proceeds, the excitation of the auxiliary magnet may be progressively reduced. This may be effective by the progressive removal, by the auxiliary contact means, of resistance from the circuit of a demagnetizing winding provided on said auxiliary magnet and connected across the terminals of the dynamo.

With an arrangement such as this, the ratchet mechanism of the battery charging regulator described in Patent No. 1,892,617 can be dispensed with and the progressive variation of resistances in the field circuits of the dynamo and motor can be performed by a simple sliding brush device working over a pair of flat contact strips.

Provision may further be made to enable the regulator to adapt its operation to variation in the value of the lamp or like load supplied by the dynamo.

Various embodiments of the invention are illustrated by way of example in the accompanying drawings in which:—

Figure 1:
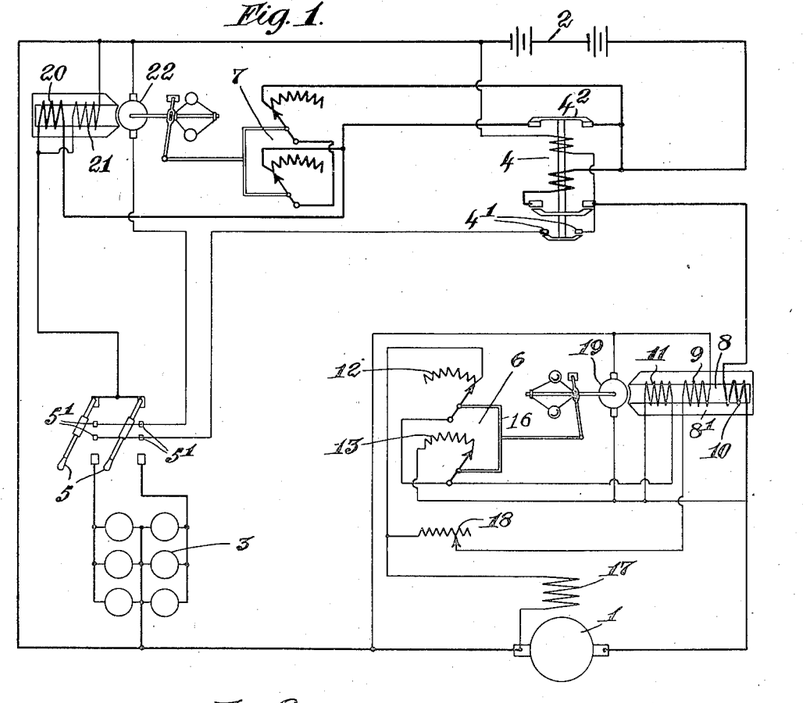
Figure 1 is a diagram illustrating the use of a dynamo regulator in accordance with the invention in a train-lighting installation.

Figure 1 illustrates diagrammatically a complete single battery train lighting installation comprising in essentials a simple shunt wound dynamo 1, a battery 2, a lighting load 3, a cut-in switch 4, a duplex lighting switch 5, a dynamo regulator 6 and a lamp voltage regulator 7.

In construction and in principle of operation the dynamo regulator 6 may be substantially identical with the regulator of Patent No. 1,892,617 but it is preferred to employ the somewhat modified constructional form to be described hereinafter. The auxiliary field magnet 8 on the motor of the dynamo regulator 6 has three windings, a polarizing winding 9, which is a magnetizing winding with reference to the permanent field magnet 8' of the regulator, a demagnetizing series winding 10 carrying the dynamo output current, and a magnetizing winding 11 carrying the whole or a part of the shunt field current of the dynamo 1. The regulator has two banks of resistances 12, 13 connected respectively to independent contact strips (not shown in Fig. 1) over which a common contact 16 is moved by the governor of the regulator. One bank of resistances 12 is connected, through said contact 16, in series with the dynamo field windings 17, and the other, 13, in parallel with the auxiliary magnet winding 11.

The polarizing winding 9 is a potential winding connected across the terminals of the dynamo 1 preferably, as shown, through the auxiliary magnet winding 11 and the part of the resistance 12 for the time being in circuit. Also in series with the polarizing winding 9 is a calibrating or adjusting resistance 18 which can be manually adjusted to vary the strength of the polarizing excitation and therewith the range of regulation. The series winding 10 is a winding consisting of a few low resistance turns connected in the output circuit between the dynamo 1 and the cut-in switch 4. The motor armature 19 is connected directly across the terminals of the dynamo 1. The polarizing and series windings 9, 10 are so designed in relation to one another that the demagnetizing effect of the latter can never be sufficient to neutralize the magnetizing effect of the former. As will be understood, the combined effects of the windings 9, 10 will influence the speed of the motor armature 19 and therewith the position of the brush 16 in relation to the contact strip of resistance 12. As the excitation of the dynamo is in turn dependent upon the position of said brush, it will be apparent that said excitation will be varied in dependency upon the variations in the voltage and current in the windings 9 and 10 respectively. The basic characteristics of the regulated dynamo 1 will therefore depend upon the design of said windings. The magnet winding 11 comprises low resistance turns connected, in series with the shunt field windings 17 of the dynamo and the variable field resistance 12, across the terminals of the dynamo. The automatically varied resistance 13 in parallel with the winding 11 serves to divert a variable proportion of the field current from said winding 11 which thus exerts upon the regulator 6 an influence varying over the range of operation thereof. By the design of the winding 11 and of the variable diverter resistance 13, the basic characteristics of the regulated dynamo, as determined wholly or in part by the combined influences of the permanent magnet 8', the polarizing winding 9 and the series winding 10, can be modified to suit particular requirements. For example it is possible to obtain a flat dynamo-output speed characteristic and, at the same time, a drooping battery-charging characteristic which ensures a tailing off of the charging current as the battery voltage rises on charge, this being generally desirable to avoid over-charging. However, a flat or rising battery charging characteristic could be obtained, if required.

An installation which is extremely efficient from all standpoints is obtained by the use of the dynamo regulator 6, as illustrated, in combination with a lamp voltage regulator 7 which is similar to that illustrated in Figure 15 of my prior specification above referred to, except that it has two windings only, a magnetizing series winding 20 lying in the lead from the cut-in switch 4 through the lighting switch 5 to the lamp-load 3, and a demagnetizing potential winding 21 connected across the lamp-load. When the cut-in and lighting switches 4 and 5 are closed the motor armature 22 of the regulator 7 is connected across the terminals of the dynamo 1, through auxiliary contacts 4' 5' on said respective switches. Thus the circuit of the armature 22 is completed and the regulator operates, only when the auxiliary contacts 4' and 5' are closed, i. e. when the lamp load is being supplied by the dynamo. When the cut-in switch 4 is open, the lamp resistance of the regulator 7 is short circuited by an auxiliary contact 4² on said switch in well known manner. An installation comprising the two regulators 6, 7 will operate highly efficiently under all the conditions likely to arise in practice and will even ensure a satisfactory supply to the load circuits 3 if the battery circuit should become interrupted, the voltage being kept within limits consistent with a reasonable supply and a safe maximum.

For certain purposes the desideratum of efficient operation under all conditions must be subordinated to that of cheapness of the installation. In such cases it may be regarded as sufficiently satisfactory if, on the one hand, the battery charging current is properly controlled when no lamp load is being supplied by the dynamo and, on the other hand, the lamp voltage is reasonably controlled when a lamp load is being supplied by the dynamo, the battery then receiving little or no charge at all. A regulator of this type is arrived at if, in effect, the windings 20, 21 of the lamp voltage regulator 7 are transferred to the dynamo regulator 6.

Figure 2:
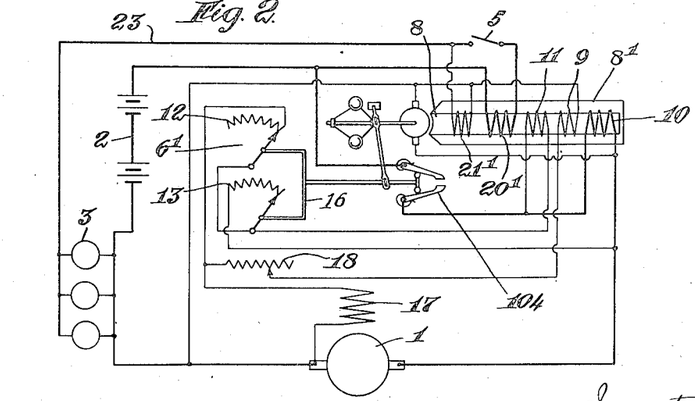
Figure 2 is a similar diagram illustrating the use of another form of dynamo regulator.
Figure 3:
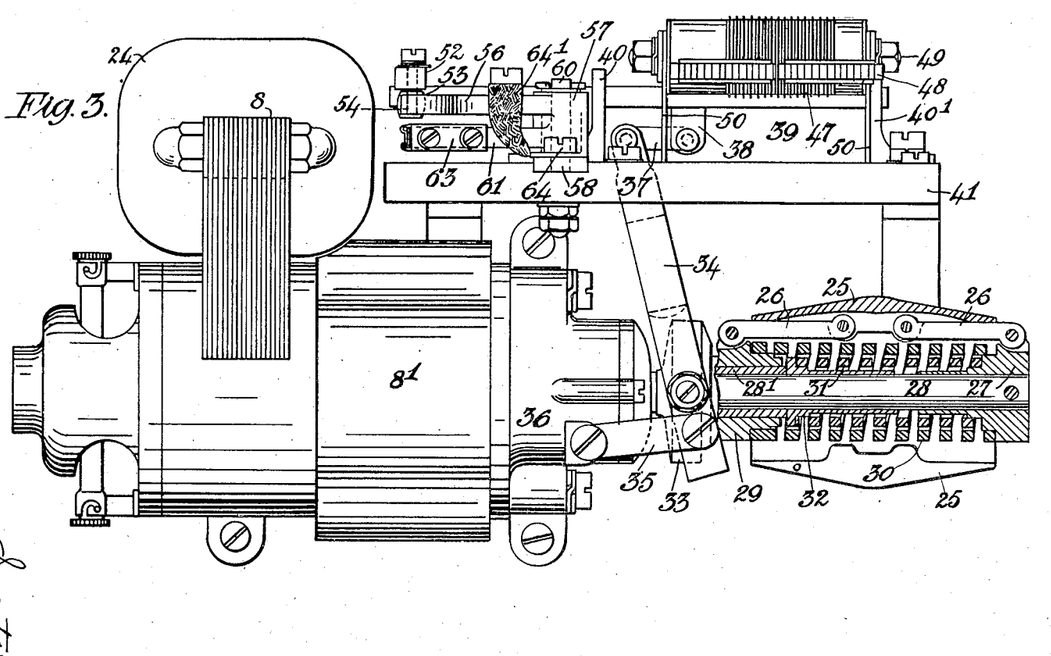
Figure 3 is a front elevation, partly in section, of a constructional form of regulator.

The resultant composite regulator 6' is illustrated in Figure 2 in which the same references have been used to indicate the corresponding parts. In the absence of the resistance of the lamp voltage regulator, a simple subsidiary contact 104 on the regulator takes the place of the cut-in switch 4. This contact may be operated in the manner described hereinafter. With the windings 9, 10, 11, 20', 21' properly proportioned, this regulator gives excellent regulation of the incomplete nature described above.

In mechanical or constructional respects the dynamo regulators described above may be similar to those described in Patent No. 1,892,617. Having regard more particularly, however, to the comparatively low currents in the field and diverter resistances 12, 13 employed, it is preferred to employ a construction (Figures 3-7) which has been modified in certain respects. As will be seen the magnet arrangement is similar to that of Figures 1-8 of the above mentioned specification. It may be mentioned that it is advantageous to wind a comparatively heavy series winding made of copper strip, such as 11, over the lighter windings on the spool 24 on the magnet 8, the series winding then constituting a robust sheath sufficient to protect the lighter windings against accidental injury.

Figures 6, 7:
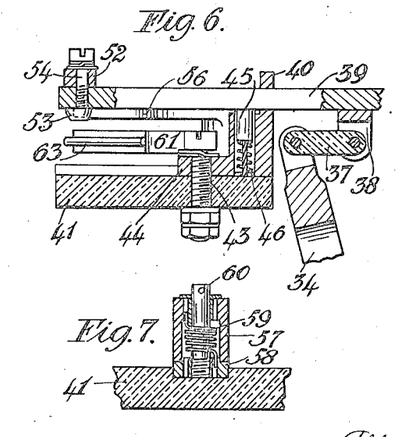
Figures 6 and 7 are sectional elevations of details.

The governor comprises three weights 25 pivotally connected by links 26 to a collar 27 fast on the armature shaft 28 and to a collar 29 slidable on said shaft. A helical compression spring 30 extends between the two collars 27, 29 and a second such spring 31 concentric with the first extends between the collar 27 and an abutment sleeve 32 slidable on the shaft 28, and initially abutting against a shoulder 28' thereon. In the closed position, the weights 25 from a barrel shaped body totally enclosing the springs. The collar 29 is freely rotatable in a ring 33 which, however, is constrained to move axially with said collar. The limbs of a forked lever 34 are pivotally connected by links 35 to the motor end bracket 36 and are pivoted on the ring 33. The upper end of the lever 34 is pivotally connected by an insulating link 37 to a lug 38 dependent from a bar 39 which is slidably supported in upstanding pillars 40 40' secured to an insulating base 41. The sliding bar 39 carries a pair of brush housings 42 containing brushes 42' which are elastically pressed into contact with the vertical faces of the contact strips 14, 15. These brushes 42' constitute the sliding contact 16 of Figure 1 or Figure 2. The single lead thereto is connected to a terminal screw 43 passing through a lug 44 on the pillar 40. The pillar 40 is also provided with a plunger 45 pressed upwardly into contact with the bar 39 by a spring 46 so as to maintain good electrical contact therewith (Figure 6).

Figure 4:
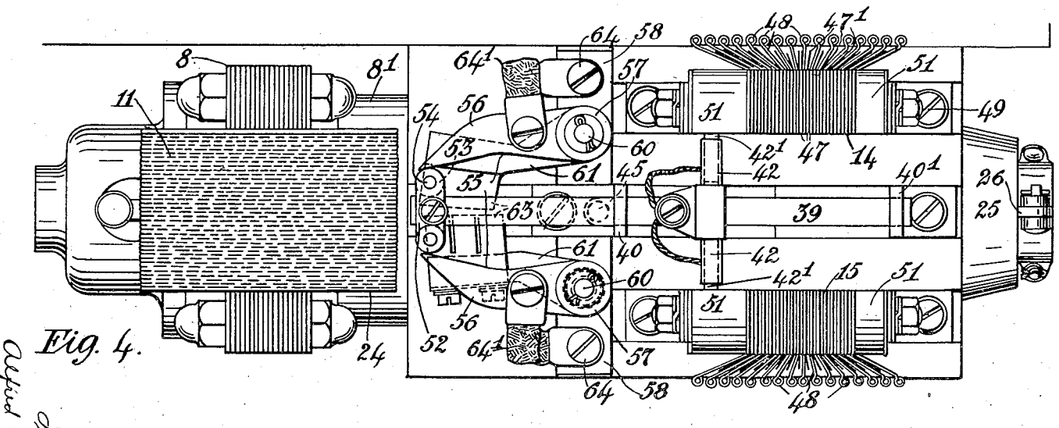
Figure 4 is a plan view and Figure 5 an end elevation thereof.
Figure 5:
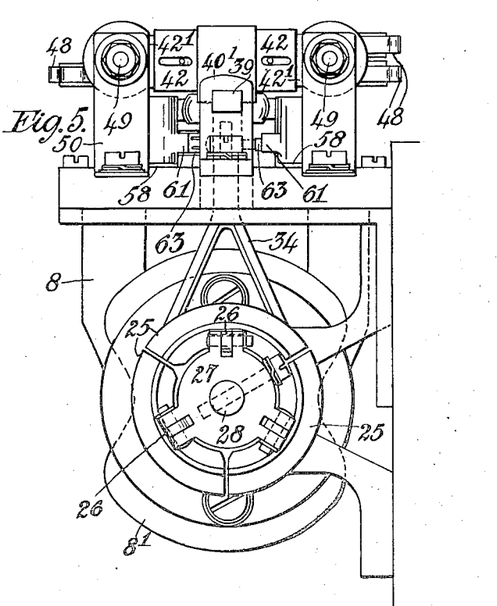

The currents in the field and diverter resistances being small, a very simple form of flat contact strip 14, 15 may be employed. Each strip is composed of a plurality of thin annular laminations 47 of copper, each having a small peripheral lug 48. The laminations are assembled over an insulating sleeve, not shown, on a rod 49 which is subsequently mounted in pillars 50 secured to the base 41. Thin separating annuli 47' of mica are also threaded on said rod between the copper laminations 47. If there is any difficulty about accommodation the lugs 48 and the leads to the sections of resistance in the space at disposal, the lugs 48 of adjacent laminations 47 may be successively staggered angularly in relation to each other over a convenient arc thereby providing ample room for the attachment of the leads. As shown, however, the lugs are aligned (Figure 3) but are splayed out somewhat to gain space (Figure 4). The required number of laminations are clamped tightly between spacing blocks 51 which serve to bring the contact strip proper opposite the effective part of the movement of the brushes 42'. The flat contact surface upon which the brushes 42' run may be milled on the assembled body of laminations before it is mounted in position on the regulator. If desired, the required width of each contact segment 47 may be built up from a plurality of laminations of standard width, the redundant lugs being nipped off or combined to make a single attachment for the lead to the segment. A contact strip built up in the manner described may be manufactured simply and inexpensively.

Figures 3 to 7 also illustrate how the cut-in switch usually employed in train lighting installations can be embodied in the regulator, as for example in Figure 2. The rod 39 is provided at its left hand end (Figure 4) with a crosspiece 52 on which rollers 53 of insulating material are rotatably mounted by means of pins 54. These rollers engage cam faces 55 formed on arms 56 which extend from sleeves 57 (Figure 7) rotatably supported on footstep bearing pieces 58 let into the base 41. Each arm 56 is loaded so as to tend to rotate inwardly towards the other by a helical torsion spring 59 coiled around a pin 60 secured in the bearing piece 58, the lower end of said spring being anchored in the latter and the upper end acting upon the sleeve 57. From the sleeves 57 there also extend switch arms 61 provided with inter-engaging switch blades 63. These switch blades are connected in the main output lead from the dynamo by means of terminals 64 and flexible connections 64'. The cams 55 are so designed that at the desired cut-in voltage, to which a particular position of the bar 39 will correspond, the rollers 53 allow the pairs of arms 56 and 61 to be rotated towards each other until the switch blades 63 make contact for cutting in the dynamo. In order that a substantial range of movement of the weights 25 and of the bar 39 shall be available for the cut-in function, the compression spring 30 only is compressed during the initial expansion of the weights 25. Substantially at the same moment as cut-in takes place, the end face of the sliding collar 29 comes into contact with the sleeve 32 so that the further expansion of the weights 25, which expansion causes the brushes 42' to traverse the contact strips 14, 15, takes place against the resistance of both springs 30, 31.

Figure 8:
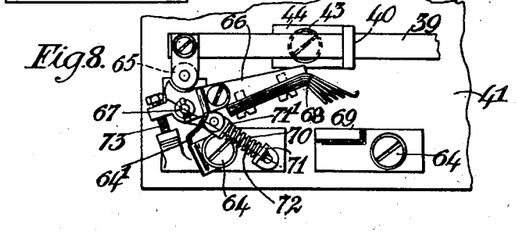
Figure 8 is a plan view of a modified detail.

Figure 8 illustrates an alternative arrangement intended to ensure a very rapid make and break at cut-in and cut-out. In this case the bar 39 carries a single roller 65 which engages a cam surface on a switch arm 66 pivoted at 67 and provided with a laminated spring brush 68 co-operating with a fixed contact 69. A compression spring 70 acts between a pivotal abutment 71 and an abutment 71' on a guide pin 72 pivotally connected to the arm 66. In the open position of the switch illustrated in Figure 8, the spring 70 tends to retain the switch open.

When the bar 39 moves to the right, however, the roller 65 causes the arm 66 to be rotated in a clockwise direction and the spring 70 to be rocked through a dead centre position beyond which it tends to assist the clockwise rotation of the switch arm 66. On the dead centre position being traversed, therefore, the switch arm 66 is thrown over into the closed position with a snap action irrespective of the continuation of the movement of the bar 39. The reverse action takes place when the switch is opened by leftward movement of the bar 39 due to a fall in voltage below the cut-in value. An adjustable stop 73 limits the return movement of the arm 66.

The single contact (63 in Figures 3 to 7; 68 in Figure 8) described above is suitable for use where only one circuit has to be controlled by the cut-in switch, for example in the case of the switch 104 of Figure 2. Where, however, it is necessary for the cut-in switch to control additional circuits, for example the circuits controlled by the contacts 4', 4² in Figure 1, it will be necessary to provide additional contacts mechanically coupled with the main contact (e. g. with the contact 68 of Figure 8) or separately actuated in unison therewith from the bar 39. Furthermore, separate switches for performing other operations, such as the control of embarkation lighting, the battery change-over in a double-battery installation and so forth, may be arranged to be operated either by the bar 39, similarly to the cut-in switch, or by some other part of the governor operated mechanism.

Figure 9:
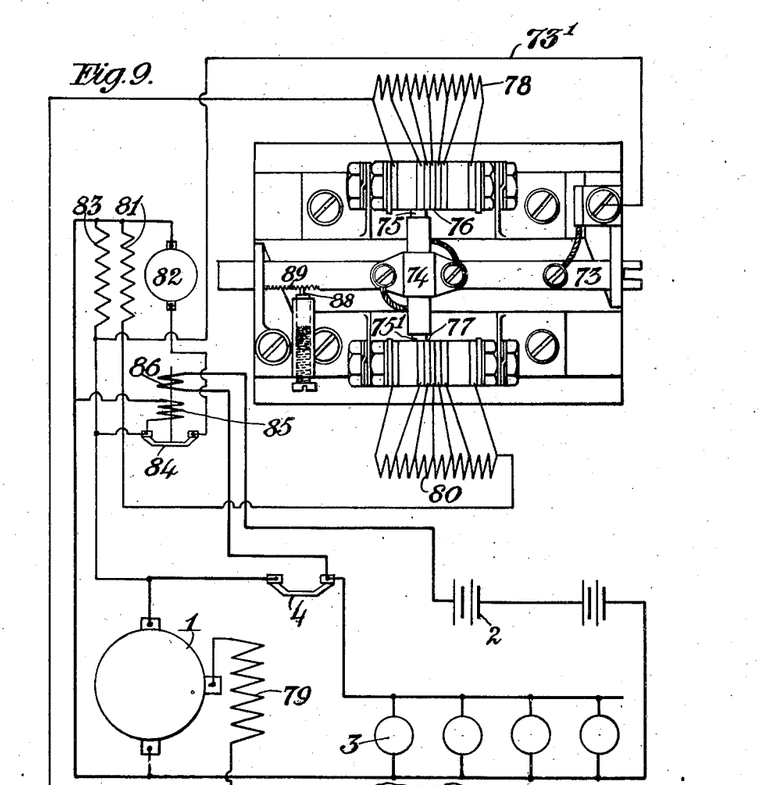
Figure 9 is a diagram illustrating the use of a battery charging regulator in accordance with the invention in a train-lighting installation.

Figure 9 illustrates a battery charging regulator according to the invention embodied in a train lighting installation comprising essential components similar to those shown in Figure 1. In respect of the construction of its motor and governor mechanism, this regulator may be similar to that described in Figures 3 to 7. For this reason said motor and governor gear will not be further illustrated. A sliding bar 73, taking the place of the bar 39, actuates a brush mounting 74 carrying a pair of brushes 75, 75' working over the vertical faces of a pair of contact strips 76, 77. For the sake of compactness, it is preferred to employ contact strips each built up from laminations assembled and supported upon an insulated rod as described with reference to Figures 3 to 5.

The contact strip 76 has its contacts connected to a series of tapping points in a resistance 78 connected to the field windings of the dynamo 1, whether simple shunt field windings or field windings 79 connected (as indicated diagrammatically) between a main brush and a subsidiary brush of the dynamo, the field circuit being as follows: main brush of dynamo, lead 73', regulator gear 73, 74, brush 75, contact strip 76, resistance 78, field winding 79, subsidiary brush of dynamo. The contacts of the other strip 77 are connected to an equal number of tappings in a resistance 80 connected to demagnetizing winding 81 on the auxiliary excitable field magnet of the regulator motor 82, said winding 81 being connected, through said resistance, across the main brushes of the dynamo. The circuit is as follows: main brush of dynamo, lead 73', regulator gear 73, 74, brush 75', contact strip 77, resistance 80, regulator winding 81, other main brush of dynamo. The auxiliary field magnet also carries a magnetizing winding 83 connected permanently across the main brushes of the dynamo 1 and so designed that the demagnetizing effect of the winding 81 will under no circumstances exceed its magnetizing effect. The motor armature 82 is likewise connected across the main brushes of the dynamo 1. In the arrangement shown, it is so connected through the movable contact 84 of a small solenoid-type relay having a shunt winding 85 connected across the main brushes of the dynamo 1 and a series winding 86 in the main lead from the battery 2 to the cut-in switch 4. The shunt winding 85, when energized, is capable of holding on the contact 84 provided that there is no reverse energization of the series winding 86 by current from the battery 2 to the load 3.

The mode of operation of this battery charging regulator is briefly as follows:—

Assume that the battery 2, in a state of complete discharge, is being charged by the dynamo 1. The brushes 75, 75' will initially be in such a position (i. e. to the left in Figure 9) that there is no resistance 78 in series with the dynamo excitation windings 79 but the full resistance 80 is in series with the motor excitation winding 81. Upon a predetermined state of charge of the battery being reached, the battery and dynamo voltages will have risen to a value at which the increased motor speed and resultant governor movement will have moved the brush 75' to the right to the contact corresponding to the insertion of one stage of the resistance 78 in series with the dynamo field 79. The dynamo output and the charging current are thereby reduced and the battery and dynamo voltages fall. This fall of voltage alone would result in the motor speed being reduced. Simultaneously with the insertion of resistance in the dynamo field circuit, however, a stage of the resistance 80 is removed from the circuit of the winding 81, increasing its demagnetizing effect, increasing the speed of the motor and thereby neutralizing any tendency for loss of speed owing to the decreased voltage. As charging continues, the motor speed then increases again as the voltage rises once more, further stages of the resistances 78, 80, e. g. six in all, being progressively inserted and removed respectively in a similar fashion. Preferably the brushes 75, 75' are advanced intermittently in jumps corresponding to the pitch of the contacts 76, 77. For this purpose the sliding bar 73 carrying said brushes may co-operate with detent means comprising a spring catch or bolt 88 engaging teeth 89, on said bar, of pitch equal to that of the contacts.

If, with the lamp load off, the regulator has operated fully to insert all the resistance 78 in the dynamo field circuit, it is conceivable that the dynamo output may have been so reduced as to be insufficient to meet a lamp load then switched on. The relay 84—86 prevents the possibility of the load being taken, under such circumstances, from the battery 2. For if, when said load is switched on, there is a reverse current from the battery 2 to the load 3, the demagnetizing action of the winding 86 will cause the relay contact 84 to open, thereby breaking the circuit of the motor armature 82 and re-setting the regulator to or towards its initial position. The load will at once be supplied from the resultant increased dynamo output, the contact 84 will close and the regulator will re-set itself to a new position which takes account of the amount of load 3 switched on. At the same time, however, the charge to the battery will still be limited by the action of the winding 83, should the battery voltage tend to rise.

Instead of employing the relay 84—86, as preferred, the auxiliary magnet of the regulator motor might carry a further, magnetizing, winding (not shown) in series with the load circuit 3. As will be understood, an increase in the load current in this winding would tend to reduce the speed of the motor 82 and thereby increase the dynamo excitation and output. This increase may be made such as to prevent the switching on of the load 3 interfering with the charging of the battery 2.

As an alternative to removing resistance 80 from the circuit of the de-magnetizing winding 81, resistance may be inserted in the circuit of a magnetizing winding as will be readily understood, the operation being identical with that described above.

The disposition of the various forms of regulator in their housings will naturally depend upon the particular circumstances. It is, however, generally desirable that the working faces of the contact strips should be in a vertical or inclined plane to hinder the settling of dust and other particles thereon. Furthermore it is generally preferable to dispose the resistance elements above the regulator, possibly in a separate housing. This enables the heat evolved to be easily dissipated without danger of the regulator being affected thereby. If the currents carried by the resistances are small, the elements thereof may be wound upon a cylindrical insulating core. The individual elements of resistances carrying larger currents may comprise zig-zag lengths of resistance wire mounted perpendicularly to a vertical insulating board carrying bored or slotted terminal blocks into which the wire ends are snapped and secured by set screws.

I claim:—

1. Electric regulator for train lighting and like installations comprising an electric motor capable of speed variations sensitive to conditions in the installation, a circuit connected to said motor, a centrifugal governor device, a driving connection between said motor and governor device, principal contact means for the regulation proper, auxiliary contact means connected in said motor circuit and adapted for exerting a progressive influence upon the motor over the range of action of the regulator, and an operative connection between the governor device and each of the contact means.

2. Electric regulator comprising a variable speed electric motor having a field circuit, a centrifugal governor device, a driving connection between said motor and governor device, principal contact means, a rheostat controlled thereby for effecting the regulation proper, auxiliary contact means, a rheostat in connection with said field circuit and controlled by said auxiliary contact means for exerting a progressive compensating influence upon the motor over the range of action of the regulator, and an operative connection between the governor device and each of the contact means.

3. An electrical installation, particularly for train lighting, comprising a variable speed electric motor connected to said installation and having a field circuit, a centrifugal governor driven by said motor, principal contact means, a rheostat connected to said installation and controlled by said contact means for regulating an electrical variable in said installation, auxiliary contact means, a rheostat connected to said field circuit and controlled by said auxiliary contact means for exerting a progressive compensation influence upon the motor, and an operative connection between the governor device and each of the contact means.

4. Electric regulator comprising an electric motor having a permanent field magnet and an auxiliary excitable field magnet, a centrifugal governor device driven by said motor, principal contact means, a regulating rheostat controlled thereby, auxiliary contact means, a rheostat connected to the excitable field magnet and controlled by said auxiliary contact means for exerting a progressive influence upon the excitation of the motor, and an operative connection between the governor device and each of the contact means.

5. Electric regulator comprising a motor armature, a permanent field magnet, an auxiliary excitable field magnet, carrying an exciting winding liable to exert a demagnetizing action with reference to the permanent magnet, a "polarizing" winding adapted for exerting a constantly magnetizing action which is never completely neutralized by the remagnetizing action of the first named winding, a centrifugal governor driven by the armature, principal and auxiliary rheostat means actuated by the governor, the principal rheostat means being arranged for performing the regulation proper whilst the auxiliary rheostat means is connected to the first named exciting winding for exerting a compensating influence upon the motor.

6. Electric regulator comprising a variable speed electric motor having an exciting circuit, a centrifugal governor driven by said motor, movable brushes actuated by said governor, a pair of contact strips over which said brushes move, a principal regulating rheostat connected to one of said contact strips and an auxiliary rheostat connected to the other of said contact strips and to said motor-exciting circuit.

7. Electrical installation, particularly a train lighting installation, having a variable-output generator with an output and a field circuit, said installation embodying a generator regulator comprising an electric motor armature, a field magnet associated with said armature, a demagnetizing series winding connected in the output circuit of the generator, a magnetizing potential winding connected across the output circuit of the generator, a series winding connected in the field circuit of the generator, said windings being arranged as exciting windings on said magnet, a centrifugal governor driven by the armature, principal and auxiliary contact devices actuated by said governor, a regulating rheostat connected to the field circuit of the generator and controlled by the principal contact device, and a compensating rheostat connected to the last named exciting winding and controlled by the auxiliary contact device.

8. Electrical installation comprising a variable-output generator, output and field circuits therefor and a generator-regulator consisting of an electric motor, a permanent field magnet and an auxiliary excitable field magnet for said motor, the latter magnet carrying three exciting windings, namely a de-magnetizing winding connected in the output circuit of the generator, a magnetizing winding connected across said output circuit and magnetizing winding connected in the field circuit of the generator, a centrifugal governor driven by the motor movable brushes actuated by said governor, a pair of contact strips over which said brushes move, a principal regulating rheostat connected to one of said contact strips and in the field circuit of the generator, and an auxiliary compensating rheostat connected to the other of said contact strips and across the last named of the exciting windings.

9. Electrical installation according to claim 8, the second named of the exciting windings carried by the auxiliary field magnet being connected across the output circuit of the generator through the part of the regulating rheostat for the time being effective in the field circuit of the generator.

10. Electrical installation comprising a dynamo, field and output circuits therefor, and a regulator consisting of an electric motor, a permanent field magnet for said motor, an excitable field magnet for said motor carrying a demagnetizing winding connected in the output circuit of the dynamo, a magnetizing winding connected across said output circuit and a magnetizing winding connected in the field circuit of the dynamo, a centrifugal governor driven by the motor, a pair of contact devices actuated by said governor, a regulating rheostat connected in the field circuit of the dynamo and controlled by one of said contact devices, a compensating rheostat which is connected across the last named of the windings carried by the excitable field magnet and is controlled by the other of said contact devices, and a calibrating rheostat connected in series with the second named of the windings.

11. Electrical installation comprising a dynamo with a field circuit, and an output circuit connected to current-consuming load circuits, and a regulator consisting of an electric motor, a permanent field magnet and an excitable field magnet for said motor, a centrifugal governor driven by said motor, a pair of contact devices actuated by said governor, a regulating rheostat connected in the dynamo field circuit and controlled by one of said contact devices, and a compensating rheostat controlled by the other of said contact devices, the excitable field magnet for the motor being provided with five exciting windings, namely a demagnetizing series winding connected in the output circuit of the dynamo, a magnetizing potential winding connected across said output circuit, a magnetizing series winding connected in the field circuit of the dynamo and in shunt with the compensating rheostat, a demagnetizing potential winding connected across the load and a magnetizing winding connected in series with one of the load circuits.

12. Electric regulator comprising an electric motor having an exciting circuit, a centrifugal governor driven by said motor, a sliding member actuated by said governor, brushes carried by said sliding member, a pair of contact strips over which said brushes are moved by said sliding member, a principal regulating rheostat connected to one of said contact strips, an auxiliary compensating rheostat connected to the other of said contact strips and to the exciting circuit of the motor, and a switch device operatively connected with the governor through the sliding member.

13. Electrical installation comprising a dynamo, a field circuit therefor, a load circuit connected thereto, and a regulator consisting of an electric motor, a field circuit therefor, a centrifugal governor driven by said motor and expansible against the resistance of a composite spring, a pair of contact strips, brushes actuated by said governor device so as to traverse said contact strips, a regulating rheostat connected to one of said contact strips and to the field circuit of the dynamo, a compensating rheostat connected to the other of said contact strips and to the field circuit of the motor, a cut-in contact located in the connection between the dynamo and the load circuit and an operative connection between the governor and said contact, initial expansion of the governor against a part of the composite spring resistance serving to close said contact and subsequent expansion against increased spring resistance serving to traverse the brushes across the contact strips.

14. An electrical installation comprising a dynamo having a field circuit, a battery connected to said dynamo, and a battery-charging regulator consisting of an electric motor with a field magnet and exciting winding, a centrifugal governor driven by said motor and principal and auxiliary rheostats controlled by said governor and connected respectively to the dynamo field circuit and to the exciting winding of the motor.

15. An electrical installation comprising a dynamo having a field circuit, a battery connected to said dynamo for being charged thereby, and a battery-charging regulator consisting of an electric motor, a permanent field magnet and an excitable field magnet for said motor, a polarizing magnetizing winding and a demagnetizing winding carried by said excitable field magnet and connected across the dynamo, a centrifugal governor driven by the motor, and principal and auxiliary rheostat devices controlled by said governor and connected respectively to the dynamo field circuit and to the demagnetizing motor-excitation winding respectively.

16. An electrical installation comprising a dynamo having a field circuit, a battery connected to said dynamo for being charged thereby, and a battery-charging regulator comprising an electric motor, a permanent field magnet and an excitable field magnet for said motor, a magnetizing winding carried by the excitable field magnet and connected across the dynamo, a centrifugal governor driven by the motor, principal and auxiliary rheostats controlled by the governor and connected respectively to the field circuit of the dynamo and to the motor-excitation winding.

17. An electrical installation comprising a dynamo having a field circuit, a battery connected to said dynamo for being charged thereby, and a battery-charging regulator consisting of an electric motor, a permanent field magnet and an excitable field magnet for said motor, a polarizing magnetizing and a demagnetizing winding carried by said excitable field magnet and connected across the dynamo, a centrifugal governor driven by said motor, sliding brush devices actuated by said governor, contact strips over which said brush devices are caused to slide, a pair of rheostats connected to said contact strips and, through said brush devices, one in the dynamo field circuit and the other in series with the demagnetizing motor-excitation winding, whereby resistance is progressively inserted in said dynamo field circuit and removed from in circuit with said motor-excitation winding as charging proceeds.

18. An electrical installation according to claim 17, provided with detent means associated with the sliding brush devices for causing the latter to move in steps pitched to correspond with the contacts of the contact strips.

19. An elecrical installation comprising a dynamo having a field circuit, a battery connected to said dynamo for being charged thereby, a load circuit connected to said dynamo and to said battery, and a battery-charging regulator consisting of an electric motor with armature and field circuits connected to said installation, a centrifugal governor driven by said motor, principal and auxiliary rheostats controlled by said governor and connected respectively to the dynamo and motor field circuits, a contact in the motor armature circuit, and an electromagnetic relay device operative upon said contact and having a potential winding connected across the dynamo and a series winding connected between the battery and the load circuit, the potential winding being constructed to hold the contact closed so long as no reverse current flows from the battery to the load through the series winding.

ALFRED EDWARD HONEY.